(12) United States Patent
Ordille et al.

(10) Patent No.: US 10,257,581 B2
(45) Date of Patent: Apr. 9, 2019

(54) DELIVERING IN-HOME CUSTOMER SERVICE VIA MULTIPLE CHANNELS

(71) Applicant: Avaya Inc., Santa Clara, CA (US)

(72) Inventors: Joann J. Ordille, Lebanon, NJ (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 375 days.

(21) Appl. No.: 15/013,629

(22) Filed: Feb. 2, 2016

(65) Prior Publication Data

US 2016/0227284 A1 Aug. 4, 2016

Related U.S. Application Data

(60) Provisional application No. 62/111,027, filed on Feb. 2, 2015.

(51) Int. Cl.
| | |
|---|---|
| H04N 21/478 | (2011.01) |
| H04N 21/258 | (2011.01) |
| H04N 21/45 | (2011.01) |
| H04N 21/41 | (2011.01) |
| H04N 21/442 | (2011.01) |
| H04N 21/4788 | (2011.01) |
| H04N 21/81 | (2011.01) |
| G06Q 30/00 | (2012.01) |
| H04N 21/236 | (2011.01) |
| H04N 7/15 | (2006.01) |

(52) U.S. Cl.
CPC ........... *H04N 21/478* (2013.01); *G06Q 30/00* (2013.01); *H04N 21/25808* (2013.01); *H04N 21/25866* (2013.01); *H04N 21/4126* (2013.01); *H04N 21/44204* (2013.01); *H04N 21/4508* (2013.01); *H04N 21/4788* (2013.01); *H04N 21/8173* (2013.01); *H04N 7/15* (2013.01); *H04N 21/23614* (2013.01); *H04N 21/4104* (2013.01)

(58) Field of Classification Search
None
See application file for complete search history.

(56) References Cited

U.S. PATENT DOCUMENTS

| | | |
|---|---|---|
| 8,041,765 B1 | 10/2011 | Krishnaswamy et al. |
| 8,239,903 B1 | 8/2012 | Weber |
| 8,925,017 B1 * | 12/2014 | Howard, Jr. ....... H04N 21/4622 725/51 |

(Continued)

OTHER PUBLICATIONS

Constine, "Gracenote's Ad Replacement System That Personalizes TV Commercials Will Start Trials In 2013," Tech Crunch, 2012, retrieved from http://techcrunch.com/2012/12/26/gracenote-tv-targeted-ads/, retrieved on May 13, 2016, 4 pages.

(Continued)

*Primary Examiner* — Nicholas T Corbo
(74) *Attorney, Agent, or Firm* — Sheridan Ross P.C.

(57) ABSTRACT

A contact center, communication system, and method are disclosed. An illustrative contact center is disclosed as enabling customer interactions via a television. As the customer interacts with the contact center, context information regarding an environment surrounding the television can be obtained by the contact center and further used to enhance the customer's interaction with the contact center, for example, by establishing additional communication channels with the customer.

18 Claims, 12 Drawing Sheets

(56) References Cited

U.S. PATENT DOCUMENTS

| | | | |
|---|---|---|---|
| 9,256,726 B2 | 2/2016 | Ordille et al. | |
| 9,264,771 B1* | 2/2016 | Oztaskent | H04N 21/44227 |
| 2005/0039214 A1 | 2/2005 | Lorenz et al. | |
| 2007/0107008 A1* | 5/2007 | Dybus | G06Q 30/02 |
| | | | 725/9 |
| 2009/0168990 A1* | 7/2009 | Makagon | G06Q 10/0631 |
| | | | 379/265.09 |
| 2013/0014141 A1* | 1/2013 | Bhatia | H04N 21/252 |
| | | | 725/10 |
| 2014/0047487 A1* | 2/2014 | Guedalia | H04N 21/43615 |
| | | | 725/80 |
| 2014/0215513 A1 | 7/2014 | Ramer et al. | |
| 2014/0334619 A1* | 11/2014 | Placiakis | H04M 3/5233 |
| | | | 379/265.12 |
| 2015/0039443 A1 | 2/2015 | Soon-Shiong | |
| 2016/0180392 A1* | 6/2016 | Liu | G06Q 30/0255 |
| | | | 705/14.53 |

OTHER PUBLICATIONS

Lunden, "Twitter Launches TV Ad Targeting, Twitter Amplify For Real-Time Videos In Stream," Tech Crunch, 2013, retrieved from http://techcrunch.com/2013/05/23/twitter-launches-twitter-amplify-for-real-time-videos-in-stream-partnering-with-bbc-fox-fuse-and-weather-channel/, retrieved on May 13, 2016, 4 pages.

Perez, "As TV Falls Apart, Tumblr and Twitter Aim To Pick Up The Peces," Tech Crunch, 2013, retrieved from http://techcrunch.com/2013/05/31/as-tv-falls-apart-tumblr-and-twitter-aim-to-pick-up-the-pieces/, retrieved on May 13, 2016, 7 pages.

Perez, "Following Investment From Curious Pictures, PlaySquare Debuts "Touchable TV" iPad Apps For Kids," Tech Crunch, 2013, retrieved from http://techcrunch.com/2013/10/11/following-investment-from-curious-pictures-playsquare-debuts-touchable-tv-ipad-apps-for-kids/, retrieved on May 13, 2016, 6 pages.

Perez, "iOS Apps Pass Browsers For The First Time As The Most Popular Way To Watch Online TV," Tech Crunch, 2014, retreived from http://techcrunch.com/2014/06/04/ios-apps-pass-browsers-for-the-first-time-as-the-most-popular-way-to-watch-online-tv/, retrieved on May 13, 2016, 6 pages.

Sills, "What 2015 Has In Store For Native Ads, TV and Email," Tech Crunch, 2014, retrieved from http://techcrunch.com/2014/12/27/native-ads-tv-and-email-in-2015/, retrieved on May 13, 2015, 5 pages.

Taylor, "Bye Bye Second Screen? The InAIR Lets You Browse The Web And Watch TV All In One Place," Tech Crunch, 2014, retrieved from http://techcrunch.com/2014/03/06/inair-second-screen-seespace-augmented-tv-demo/, retrieved on May 13, 2016, 2 pages.

\* cited by examiner

DELIVERING IN-HOME CUSTOMER SERVICE VIA MULTIPLE CHANNELS

CROSS-REFERENCE TO RELATED APPLICATIONS

The present application claims the benefit of U.S. Provisional Patent Application No. 62/111,027, filed on Feb. 2, 2015, the entire contents of which are hereby incorporated herein by reference.

BACKGROUND

Customer satisfaction is often an important consideration for contact centers and their administrators. However, most contact centers only allow a customer to engage the resources of the contact center via a single communication channel at a time. This limitation of a single communication channel can be a limiting factor in providing a positive customer experience.

DETAILED DESCRIPTION

Figure 1:
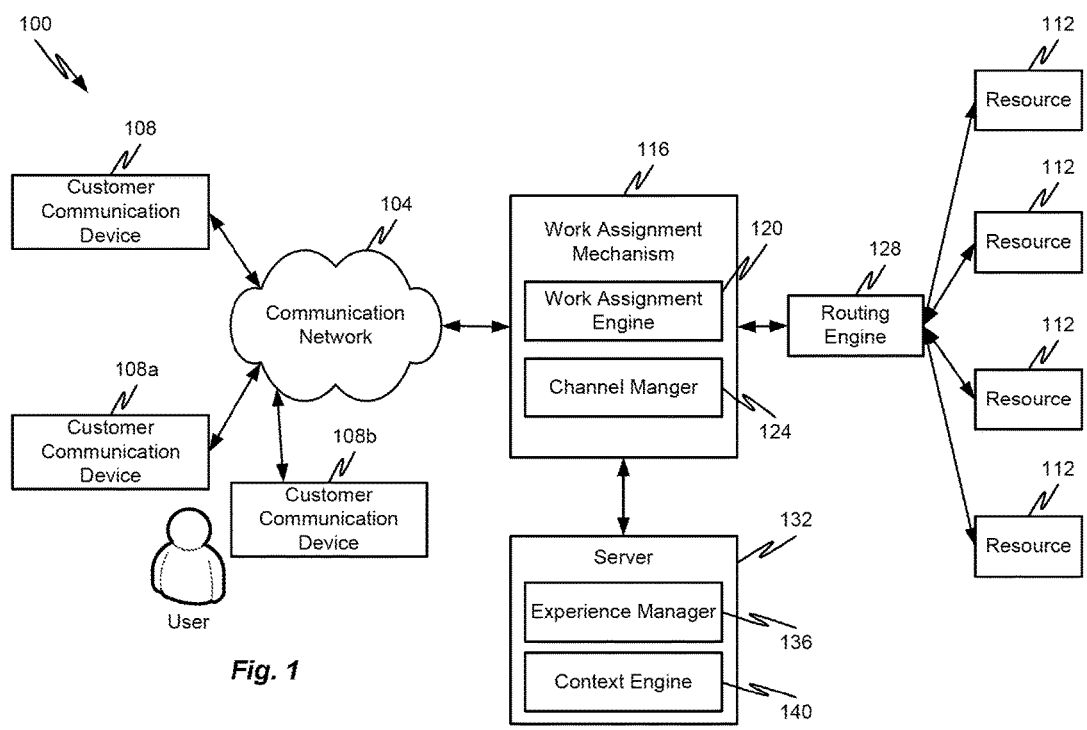
FIG. 1 depicts a block diagram of a communication system in accordance with at least some embodiments of the present disclosure.

Embodiments of the present disclosure will be described in connection with the execution of a multichannel contact center. As will be discussed herein, the term "multichannel" can refer to a contact center having one or multiple different channels of communication with a single customer. A channel of communication may correspond to a physical channel (e.g., a data path across a communication network that includes a plurality of nodes and interconnecting wired or wireless communication links), a logical channel (e.g., a protocol-dependent communication modality), and/or combinations thereof. It should also be appreciated that different communication channels may or may not carry different media types. For instance, one communication channel may be capable of carrying first and second media types (e.g., voice and data) and a second communication channel may be capable of carrying only one of those media types (e.g., data). In such an example, the communication channels do not necessarily carry mutually exclusive media types. In another example, one communication channel may carry one media type (e.g., video, which is a combination of image and voice) and another communication channel may carry a different media type (e.g., data). As will be discussed herein, embodiments of the present disclosure consider the deployment of a contact center that enables a flexible interaction with a customer and one way of achieving such flexibility is with the presentation of media/channel communication options.

Television (TV) and the TV viewing experience has and is continuing to undergo a fundamental shift. In particular, while TV is still the primary media for delivering broadcast media to a household and hotel rooms, traditional TV platforms are being supplemented, and in some instances replaced, with Internet-based platforms. The primary advantage offered by Internet-based platforms is the ability to engage in a two-way exchange of information whereas traditional TV technologies are one-way. Non-limiting examples of the protocols that can be used to enhance TV broadcast capabilities include ATVEF-A and ATVEF-B standards, both of which are hereby incorporated herein by reference in their entirety.

As an example, several media delivery companies consume a significant amount of the Internet's overall bandwidth by streaming video and media to users. Targeted advertising for TV has always been the goal, but implementation of these concepts have yet to fully develop. While much attention has been paid to targeted advertising or, in some cases, developing interactive television for advertising purposes, there has been little attention paid to facilitating a customer service experience to users in their living room.

Embodiments of the present disclosure propose the ability to facilitate a seamless contact center interaction with a customer in their house and/or hotel room while the user is in the presence of their TV, including the ability to detect a response by a customer that triggers the customer's TV to establish a video call or conference with a contact center agent. While and/or before the agent is connected with the customer, the TV may begin a process of gathering and providing contextual information about the customer or the customer's environment to the contact center.

In some embodiment, the following high-level process may be followed. As a non-limiting example, a customer service desire is identified and requested based on a TV viewing experience (e.g., specific company ad, in content placement, temporal proximity device usage, etc.). Thereafter, the customer may initiate the service through TV, voice, remote control, adjunct device query, or other method. The customer's context may then be collected, including viewing history, set-top box interactions, purchases, account services, connected devices in physical proximity of the TV, etc. The contact center may then be connected with the customer for automated and/or live agent interactions (this connection may be through the TV in one example). In some embodiments, proximity devices (e.g., devices within a particular physical proximity of the TV) are shared and potentially connected and made available for possible transaction use or reference. Customer service interaction continues leveraging context and multi-device experience driven by the TV initiation experience.

As a more specific, but non-limiting example, a customer interaction begins between a customer and agent via a Picture-In-Picture (PIP) display of a user's TV. The customer interaction may begin when the customer positively responds to an interactive advertisement (e.g., pressed a button on their remote when an advertisement was displayed to the customer that indicated "press here to talk with an agent"). This response by the customer may have triggered the user's TV to establish a video call or conference with a contact center agent. While and/or before the agent is connected with the customer, the TV may begin a process of providing contextual information about the customer to the contact center.

Contextual information may correspond to viewing history information, video capture information obtained about the customer, video capture information obtained about the background around the customer (e.g., what objects are in the background), information obtained from devices paired with the TV (e.g., smartphone, tablet, laptop, router, etc.), information obtained directly from the customer (e.g., via an IVR interaction with the customer), information obtained indirectly from the customer's interaction with other service providers, and other information. This contextual information can be used to build a customer profile that is delivered to the contact center. As the customer interacts with the contact center using different devices (e.g., devices other than the TV), additional context information can be provided to the contact center (e.g., regarding the types of devices being used by the customer, manner in which the devices are being used, sophistication with which the devices are being used, etc.). In some embodiments, all of this additional information is continuously used to build the customer's profile within the contact center.

Once the interaction is completed or prior to the interaction beginning with an agent, the customer may be asked if the contact center can use the information obtained during the call for quality purposes and/or for feedback to the entity responsible for delivering the interactive advertisement. By providing this valuable contact center feedback to the entity that delivered the interactive advertisement, the advertising entity can determine in near-real-time the value of their advertisement. In this case, the ad turns personal to ask for and get the context. This initially starts on the streaming device (TV) and then once established brings other devices/channels into the picture.

As another specific but non-limiting example, consider a customer that is watching a broadcast TV program (e.g., the Super Bowl) that is being broadcast to millions of homes. During the broadcast, the user is presented with an advertisement for shoes and a number is displayed as part of the broadcast advertisement. The customer employs their smartphone to dial the displayed number and while dialing the displayed number, the smartphone "listens" for surrounding audio content and hears the broadcast advertisement for the shoes, other broadcast information, the TV program, or other background noise. The information is utilized as contextual information and provided to the contact center when the call is received. Upon receiving the contextual information, the contact center can build a customer profile for the caller that includes information about the advertisement that triggered the call (e.g., due to knowledge that user dialed the number displayed during the broadcast ad), contextual information surrounding the caller (e.g., whether the caller is still watching the program, whether the caller is in the presence of other people/a noisy environment, etc.), and the like.

In some embodiments, viewing history is included as part of context, but there is also the context of what services the customer has bought from the "TV"/media service provider, and demographic information that the "TV" service provider has, and the history of which commercials the customer has responded to previously. If the system can close the loop on whether the vendor had a successful outcome with the customer as part of the response to the commercial, then that is excellent data for customizing the advertising through the TV medium. All of this type of information can be provided as part of the customer profile. The customer profile can then be delivered to an agent to assist the agent with the interaction. Furthermore, agent scripts can be created based on the customer profile. The agent scripts can be delivered to the agent, allowing the agent to maintain a proper focus on the interaction with the customer. Further still, if the customer is determined to be in a noisy environment, the agent may ask the customer to establish a second communication channel (e.g., via the TV, a data channel on their laptop, a data channel on their smartphone, etc.) to help overcome the noisy environment that may not be conducive to a pure audio interaction.

As additional communication channels are established, each channel may be bound to one another by the contact center, thereby enabling the contact center and the agent to treat each channel as a single interaction. One mechanism for performing this binding is described in U.S. patent application Ser. No. 14/309,515, filed Jun. 19, 2014, the entire contents of which are hereby incorporated herein by reference in their entirety, except that the kiosk is replaced with the customer's TV.

As yet another specific but non-limiting example, consider a scenario where a user is viewing TV and the primary content (e.g., TV show, football game, movie, etc.) takes a commercial break. During this commercial break, the customer may turn their attention away from the TV and begin interacting with other nearby devices (e.g., smartphone, laptop, tablet, etc.). As the customer interacts with their other nearby devices, the nearby device may listen to the content being delivered during the commercial break by the TV. Content from the TV may be used to determine what type of advertising content, if any, should be delivered to the customer (e.g., while browsing various websites with a web browser). If the customer initiates a call with a contact center using their other device, the other device may have a knowledge that the TV is also within proximity (e.g., viewing and/or listening distance) of the customer. With this knowledge, the contact center agent may ask the customer to establish a second (or third) communication channel with the contact center via their TV.

Once the customer has established multiple communication channels with the contact center, the agent and/or contact center logic can analyze the what type of information is being exchanged during the interaction and optimize the interaction by having certain types of information delivered via different channels to in an optimal fashion. For instance, if video information needs to be delivered between the agent and customer (either from agent to customer or from customer to agent), then the TV may be the optimal channel to deliver this information. On the other hand, if the customer needs to fill out a form or accept some sort of license or agreement, then it may be desirable to send the customer this particular information over a data channel (e.g., a web page, a shared document, via email, etc.) and this information can be delivered to another device that is being operated by the user. Further still, instructions or personal interactions between the customer and agent may occur via the traditional voice channel or via a text chat channel. As different information needs to be shared during the interaction, the contact center and/or agent may select the appropriate channel to carry the information.

In some embodiments, a service might say, "We can help you better if we add your x (TV, SmartPhone, etc.)" to the communication session. Or, "We know you are busy with a Super Bowl party, how about if we schedule a call to help you Monday at 10:00 am to your cell?" It may also be possible with the context of the living room to provide suggestions like: "Do you want me to send this recipe to the tablet in your kitchen?" "Do you want me to send this commercial to your husband with your comments?" "Do you want to use the voice recognition on your SmartPhone to supply input to this form (on your PC/laptop)?"

With this additional context information provided or with the ability to setup multi-channel communication sessions, a service provider is in the position to say: "We can help you better if we add your x (TV, SmartPhone, etc.)." It's also in the position to suggest that many people find it useful to have an x to make this type of service easier. In another example, if I don't have a tablet in my kitchen and I'm printing a recipe, it might say "Did you know that 56% of people send recipes to a tablet in their kitchen rather than printing them? Would you be interested in seeing some options for setting up a tablet in your kitchen?"

While the illustrative embodiments described herein show the various components of a system collocated, it is to be appreciated that the various components of the system can be located at distant portions of a distributed network, such as a communication network and/or the Internet, or within a dedicated secure, unsecured, and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed. The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

With reference now to FIGS. 1-8, various examples or features capable of deployment with a contact center (e.g., a multichannel contact center) will be described in accordance with at least some embodiments of the present disclosure. The following description is not intended to limit the claims to any particular embodiment described in connection with a particular figure. To the contrary, elements from any of the figures may be combined with other elements from other figures to provide a functional and efficient multichannel contact center. For instance, the features of FIG. 1-3E may be adapted to perform some or all of the methods or scenarios described in any of FIGS. 4-8.

With reference initially to FIG. 1, an illustrative communication system 100 will be described in accordance with at least some embodiments of the present disclosure. The communication system 100 of FIG. 1 may be a distributed system and, in some embodiments, comprises a communication network 104 connecting one or more customer communication devices 108 to a work assignment mechanism 116, which may be owned and operated by an enterprise administering a contact center in which a plurality of resources 112 are distributed to handle incoming work items from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 128 to connect the communication device 108 to the assigned resource(s) 112.

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, cellular phone, smartphone, telephone, or combinations thereof. In general, each communication device 108 may be adapted to support video, audio, text, and/or data communications with other communication devices 108 as well as the processing resources 112. The type of physical medium used by the communication device 108 to establish a communication channel or multiple communication channels with the resources 112 of the contact center may depend upon the capabilities of the communication device 108, the capabilities of the contact center and the contact center resources 112, the type of network 104 connecting the communication device(s) 108 with the resources 112, etc. It should be appreciated that any media type may be used to exchange communications between a customer and resource 112 and one or a plurality of communication channels (e.g., physical or logical pathways) may carry these different media types. It should also be appreciated that two or more communication devices (e.g., a first communication device 108a and second communication device 108b) may be associated with a single user as shown in FIG. 1.

The work assignment mechanism 116 (or a server deploying the work assignment mechanism 116) may further include a channel manager 124 that is configured to manage the utilization of the various communication channels within the contact center. In some embodiments, the channel manager 124 may correspond to a set of instructions stored in computer memory that, when executed by a microprocessor, enable the contact center to operate as a multichannel contact center. The channel manager 124 may further enable simultaneous TV and non-TV interactions with a single customer/user (e.g., via first communication device 108a and second communication device 108b). Further still, the channel manager 124 may be configured to solicit a customer to engage with the contact center via more than one communication channel, even if only for the resolution of a single work item.

In accordance with at least some embodiments of the present disclosure, the work item can be sent toward a collection of processing resources 112 via the combined efforts of the work assignment mechanism 116 and routing engine 128. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In addition to the channel manager 124, the work assignment mechanism 116 comprises a work assignment engine 120 which enables the work assignment mechanism 116 to make intelligent routing decisions for work items. In some embodiments, the work assignment engine 120 can determine which of the plurality of processing resources 112 is qualified and/or eligible to receive the work item and further determine which of the plurality of processing resources 112 is best suited (or is the optimal processing resource) to handle the processing needs of the work item. In situations of work item surplus, the work assignment engine 120 can also make the opposite determination (i.e., determine optimal assignment of a work item resource to a resource).

The contact center may further include a server 132 or collection of servers that assist with the management of customer's experience while interacting with the contact center and resources 112 of the contact center. In some embodiments, the server(s) 132 include an experience manager 136 that and/or context engine 140 may be embodied as instructions in memory that are executable by a microprocessor of the server 132.

The experience manager 136, when executed, may enable the contact center to deliver additional channels of communication (or offers for such) to a customer's communication device 108, determine that multiple communication channels have been established by a customer but are related to a single work item, monitor the various communication channels being used by a customer to determine if the customer is satisfied/dissatisfied, etc. The experience manager 136 may also be equipped to deploy one or more remedial measures if a customer is determined to be dissatisfied or less than totally satisfied with their customer service experience in the contact center. Examples of remedial measures that may be deployed include, without limitation, alerting a supervisor, connecting a supervisor to one of the communication channels, including a speech analytics module into the communication session to further analyze the interaction, starting a recording of the interaction or media exchanged during the interaction, etc.

The context engine 140, when executed, may enable the contact center to receive and process context information. More specifically, the context engine 140 may enable a microprocessor of the server 132 (or some other server) to receive context information from a customer communication device 108, parse the received context information to separate it into discrete pieces, and store the parsed context information in a database of the contact center as part of a customer profile. The types of context information that may be processed with the assistance of the context engine 140 include, without limitation, customer location, number and identity of customer communication devices 108 within proximity of a customer, communication capabilities of communication devices 108 within proximity of a customer, customer TV viewing history, customer web searching history, customer web navigation history, customer service use history (e.g., media browsing and purchasing history), environmental context information surrounding the customer (e.g., noises detected near the customer, devices detected near the customer, objects detected near the customer, etc.), customer history with the contact center, customer history with a service provider, movement of the user (e.g., relative to devices or relative to a point in space), and combinations thereof.

Although the server 132 is depicted as being separate from the work assignment mechanism 116, it should be appreciated that these two elements may be combined. For example, the server 132 may deploy the experience manager 136 and some or all of the components of the work assignment mechanism 116. Alternatively or additionally, the work assignment mechanism 116 may deploy the experience manager 136 as a separate component or as part of the channel manager 124.

Figure 2:
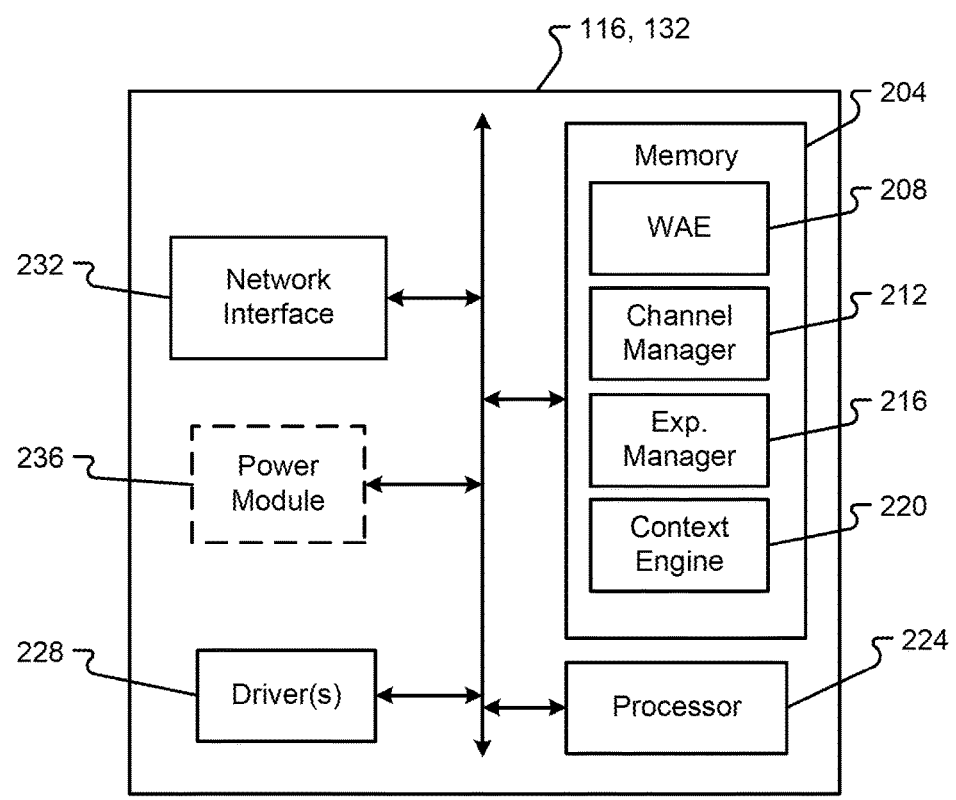
FIG. 2 is a block diagram depicting components of a server used in a contact center in accordance with at least some embodiments of the present disclosure.

With reference now to FIG. 2, additional details of a server 116, 132 that may be used within a contact center will be described in accordance with at least some embodiments of the present disclosure. The server 116, 132 is shown to include computer memory 204 that stores one or more instructions sets, applications, or modules, potentially in the form of a work assignment engine 208, channel manager 212, experience manager 216, and/or context engine 220. The server 116, 132 is also shown to include a processor 224, one or more drivers 224, a network interface 232, and an optional power module 236.

The memory 204 may correspond to any type of non-transitory computer-readable medium. In some embodiments, the memory 204 may comprise volatile or non-volatile memory and a controller for the same. Non-limiting examples of memory 204 that may be utilized in the reader 108 include RAM, ROM, buffer memory, flash memory, solid-state memory, or variants thereof. Any of these memory types may be considered non-transitory computer memory devices even though the data stored thereby can be changed one or more times.

The applications/instructions 208, 212, 216, 220 may correspond to any type of computer-readable instructions storable in memory 204. The functions of the instructions 208, 212, 216, 220 may be similar or identical to the work assignment engine 120, channel manager 124, experience manager 136, and context engine 140, respectively. FIG. 2 is illustrative for purposes of showing a single server implementing all of the possible contact center modules described in connection with FIG. 1. It should be appreciated that a server 116, 132 may implement only a subset of the applications/instruction sets stored in memory 204.

The processor 224 may correspond to one or many microprocessors that are contained within a common housing or blade with the memory 204. The processor 224 may be a multipurpose, programmable device that accepts digital data as input, processes the digital data according to instructions stored in its internal memory, and provides results as output. The processor 224 may implement sequential digital logic as it has internal memory. As with most known microprocessors, the processor 224 may operate on numbers and symbols represented in the binary numeral system.

The driver(s) 228 may correspond to hardware, software, and/or controllers that provide specific instructions to hardware components of the server 116, 132, thereby facilitating their operation. For instance, the network interface 232 and/or memory 204 may each have a dedicated driver 228 that provides appropriate control signals to effect their operation. The driver(s) 228 may also comprise the software or logic circuits that ensure the various hardware components are controlled appropriately and in accordance with desired protocols. For instance, the driver 228 of the network interface 232 may be adapted to ensure that the network interface 232 follows the appropriate network communication protocols (e.g., TCP/IP (at one or more layers in the OSI model), UDP, RTP, GSM, LTE, Wi-Fi, etc.) such that the network interface 232 can exchange communications via the communication network 104. As can be appreciated, the driver(s) 228 may also be configured to control wired hardware components (e.g., a USB driver, an Ethernet driver, fiber optic communications, etc.).

The network interface 232 may comprise hardware that facilitates communications with other communication devices over the communication network 104. As mentioned above, the network interface 232 may include an Ethernet port, a Wi-Fi card, a Network Interface Card (NIC), a cellular interface (e.g., antenna, filters, and associated circuitry), or the like. The network interface 232 may be configured to facilitate a connection between the server 116, 132 and the communication network 104 and may further be configured to encode and decode communications (e.g., packets) according to a protocol utilized by the communication network 104.

The power module 236 may include a built-in power supply (e.g., battery) and/or a power converter that facilitates the conversion of externally-supplied AC power into DC power that is used to power the various components of the server 116, 132. In some embodiments, the power module 236 may also include some implementation of surge protection circuitry to protect the components of the server 116, 132 from power surges.

With reference now to FIGS. 3A-E, various possible configurations of a contact center 304 will be described in accordance with at least some embodiments of the present disclosure. The various configurations are not intended to be limiting and may be combinable. For instance, aspects of the configuration in FIG. 3A may be modified to accommodate aspects of the configuration in FIG. 3E, or vice versa. Indeed, the following discussion of possible contact center 304 configurations is for illustrative purposes only.

Figure 3A:
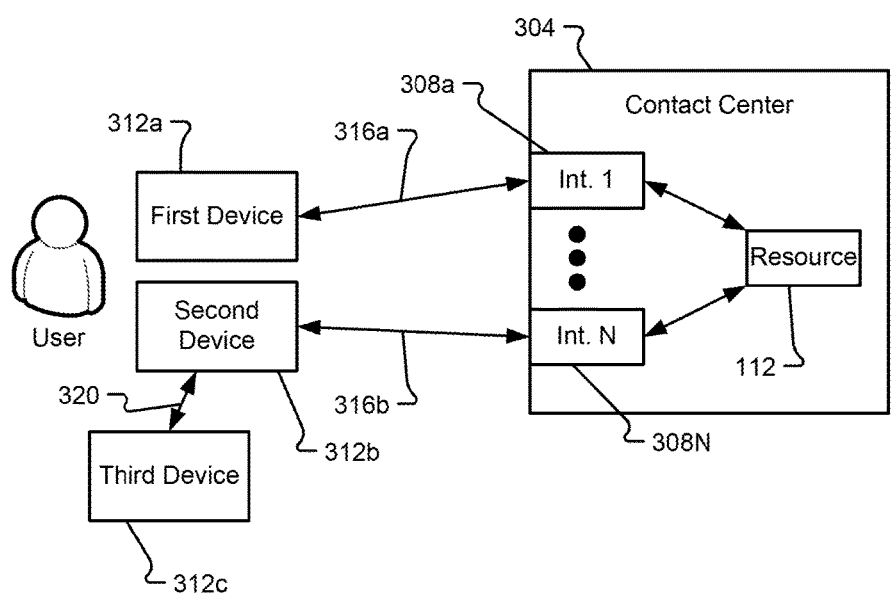
FIG. 3A is a block diagram depicting a first illustrative configuration of a contact center interaction in accordance with at least some embodiments of the present disclosure.

FIG. 3A illustrates a first configuration of a multichannel contact center 304 interaction with a user/customer in accordance with at least some embodiments of the present disclosure. This first possible configuration shows the contact center 304 as having up to N communication interfaces 308a-N, where N is an integer value greater than or equal to 1. Each communication interface 308a-N may correspond to a particular communication port or pathway in the contact center 304, a particular communication port/network interface 232 of a server 116, 132, or the like. In some embodiments, each interface 308a-N is addressed separately, meaning that a communication channel 316a established over the first interface 308a will not interfere with a communication channel 316b established over another interface (e.g., the Nth interface 308N). In some embodiments, each communication channel 316a, 316b may be configured to carry media of a different type or of the same type. As a non-limiting example, the first communication channel 316a may carry video packets between the customer's communication device 108 and the contact center 304 whereas the second communication channel 316b may carry data packets between the customer's communication device 108 and the contact center 304. In another non-limiting example, the first communication channel 316a may carry data using a web-based communication protocol (e.g., HTTP, SMTP, etc.) while the second communication channel 316b may carry video using a video-delivery communication protocol (e.g., SIP, H.245, H.263, H.323, etc.).

In the embodiment depicted in FIG. 3A, the first communication channel 316a travels between the customer's first communication device 312a and the first interface 308a of the contact center 304. The first communication device 312a may correspond to an example of customer communication device 108. The second communication channel 316b travels between the customer's second communication device 312b and the Nth interface 308N of the contact center 304. The second communication device 312b may also correspond to an example of the customer communication device 108. As a more specific but non-limiting example, the first communication device 312a may correspond to a TV and the second communication device 312b may correspond to a smartphone or tablet. FIG. 3A further depicts a third communication device 312c that is within communication proximity of the communication devices 312a, 312b and further connected to the second communication device 312b via a link 320. The link 320 may correspond to a proximity-based communication channel such as a Bluetooth, BLE, WiFi, infrared, or NFC communication channel. In some embodiments, the link 320 may correspond to any type of data link, voice link, video link, or combination thereof established between the devices 312b, 312c.

It should be appreciated that more than two communication channels 316 may be established between a customer's communication devices 312a, 312b and the contact center 304 without departing from the scope of the present disclosure. The communication channels 316a, 316b may be established over a common network 104 even though different interfaces are used. Furthermore, since there are two or more communication channels 316a, 316b established between the customer and contact center 304, the contact center 304 may view each communication as different work items unless some intelligence is built into the contact center 304. In some embodiments, it may become desirable to logically bind or associate the two different communication sessions over the communication channels 316a, 316b so that the contact center 304 is able to view the multiple communication sessions as a single work item or customer interaction. In other words, even though the different communication channels 316a, 316b carry different media and different content, both channels 316a, 316b may be routed to the same contact center resource 112 (e.g., agent), thereby allowing the resource 112 to interact with the customer via the multiple channels.

In some embodiments, the communication channels 316a, 316b may be initiated at different times, but may simultaneously exist for at least an amount of time. Thus, a user/customer may simultaneously interact with the resource 112 using both their first communication device 312a and second communication device 312b. Moreover, it may be possible to carry context information regarding the user/customer to the contact center 304 via one or both communication channels 316a, 316b without departing from the scope of the present disclosure. The context information carried to the contact center 304 may assist the resource 112 in effectively and efficiently servicing the user/customer.

Figure 3B:
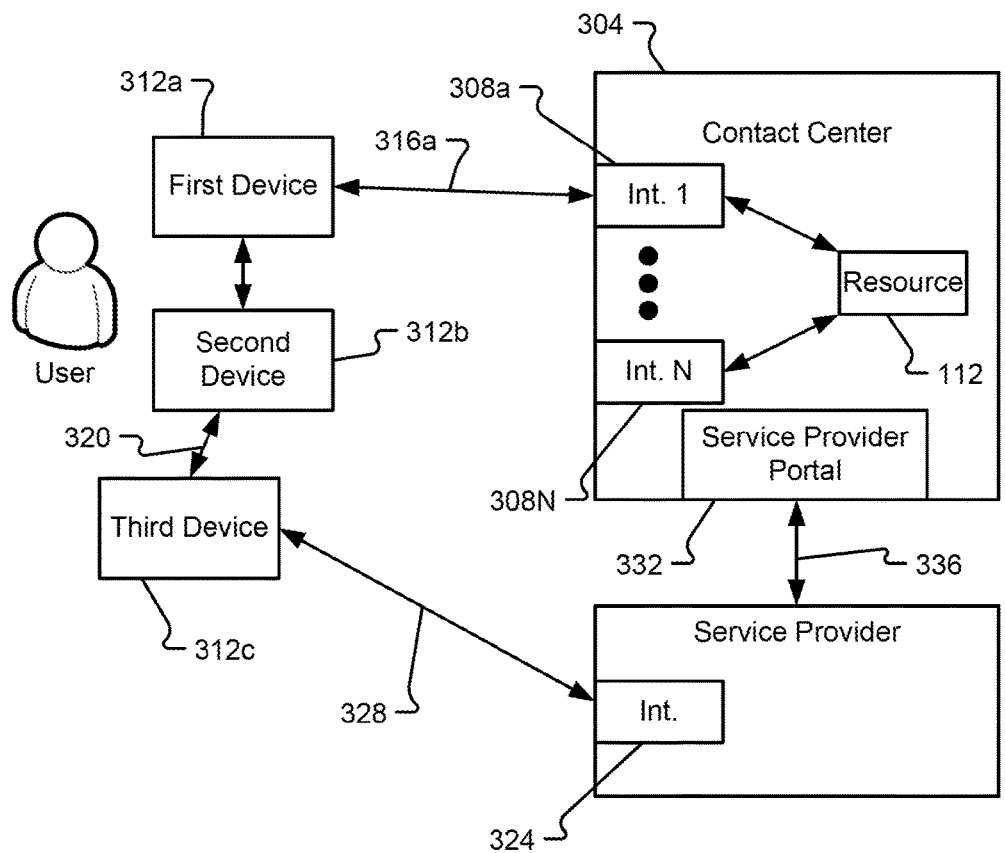
FIG. 3B is a block diagram depicting a second illustrative configuration of a contact center interaction in accordance with at least some embodiments of the present disclosure.

FIG. 3B shows a second possible configuration where the customer is connected to the contact center 304 via a single communication channel 316b, but also connected to a service provider interface 324 via a separate communication channel 328. In such an embodiment, the user may utilize their first communication device 312a to engage the resource 112 of the contact center 304 while also accessing services provided by the service provider on their third communication device 312c. Furthermore, the contact center 304 may be in communication with the service provider via a backend link 336, which provides connectivity between the service provider and contact center 304. In some embodiments, the service provider may receive context information about the user via the third communication device 312c and pass the received context information (or a filtered version thereof) to the contact center 304 via a service provider portal 332. The contact center 304 may then use the received context information to help assist the resource 112 during an interaction with the user/customer.

As a non-limiting example, the user may use their third communication device 312c as a TV or the like to receive a broadcast signal or some other streaming media over the separate communication channel 328. If the user decides to engage the contact center 304 at some point, information about the user's viewing history or current viewing habits may be known by service provider and shared to the contact center 304 via the service provider portal 332. It should be appreciated that this viewing history may be learned directly from the TV or from some other communication device that was being used to navigate the TV or browse for content to be delivered via the TV. The other devices from which the viewing history are obtained may or may not be in communication proximity with the TV. The user may engage the contact center 304 with their first communication device 312a (e.g., a smartphone, tablet, etc.). Because the first device 312a is within proximity of the third device 312c, it may be possible to link the user's viewing experience and context known by the service provider with the customer interaction at the contact center 304. This proximity may be known via the shared connection with the second device 312b and one or both of the first and third communication devices 312a, 312c may share this connection information with the contact center 304 and/or service provider. In a non-limiting example, the second communication device 312b may correspond to a router (e.g., wired, wireless, or both) that provides wired and/or wireless connectivity for both the first device 312a and third device 312c with one or more different communication networks. Another non-limiting example may correspond to a customer using a desktop computing device to engage in a video call or chat over the first communication channel 316a and then a browser on the computing device to exchange data over the separate communication channel 328 using HTTP, HTTPS, or the like.

Figure 3C:
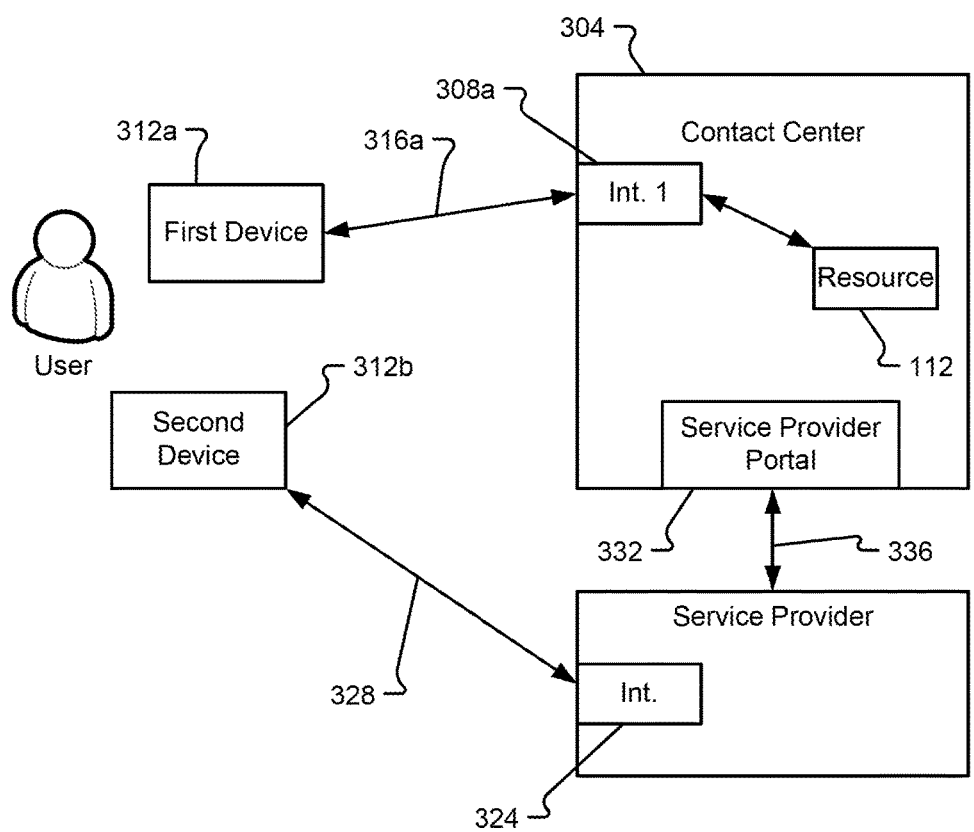
FIG. 3C is a block diagram depicting a third illustrative configuration of a contact center interaction in accordance with at least some embodiments of the present disclosure.

FIG. 3C shows a third possible configuration where the customer utilizes two different communication devices 312a, 312b to communicate with the contact center 304 and there is no binding device between the first and second communication devices 312a, 312b. In this scenario, the first communication device 312a is used to establish the first communication session over the first communication channel 316a with the contact center 304 whereas the second communication device 312b is used to establish a second communication session over the separate communication channel 328. The contact center 304 may have knowledge of the second communication session by receiving information about the connection via the service provider portal 332. As with FIGS. 3A and 3B, the contact center 304 may still employ two different communication interfaces 308a, 308N to facilitate the multichannel communication with the customer although only a single communication interface 308a is shown.

Figure 3D:
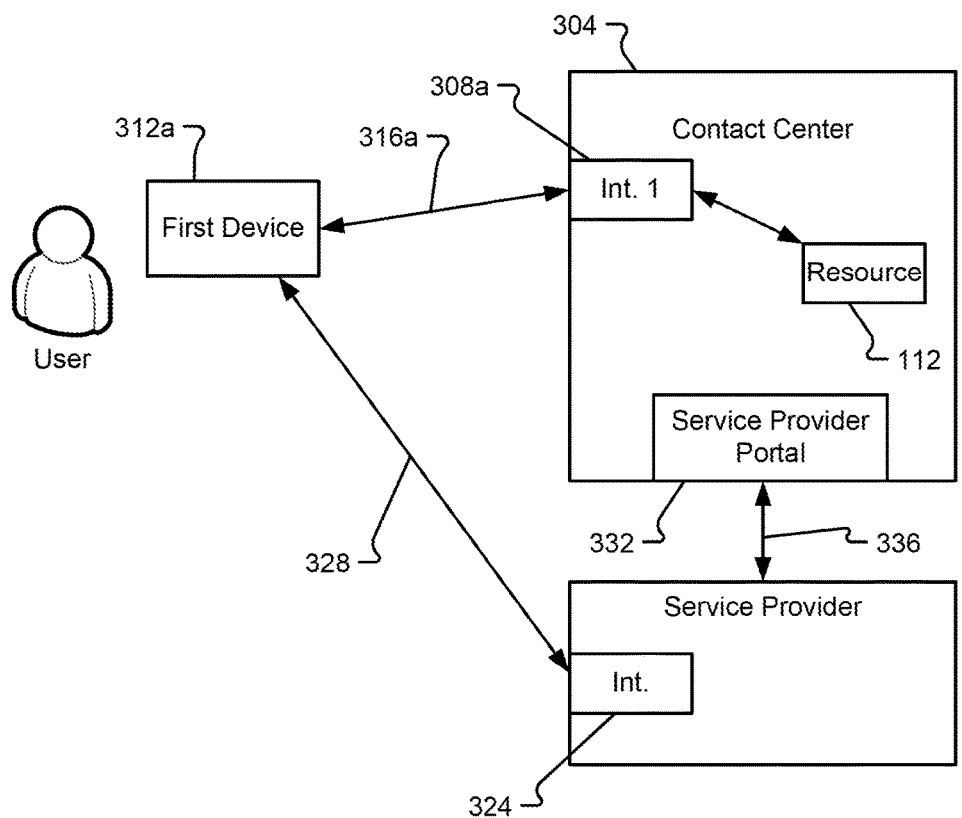
FIG. 3D is a block diagram depicting a fourth illustrative configuration of a contact center interaction in accordance with at least some embodiments of the present disclosure.

FIG. 3D illustrates a fourth possible configuration that is similar to the configuration of FIG. 3C, except that the user/customer employs a single communication device 312a to communicate with both the contact center 304 and service provider. This particular configuration may be afforded when the first communication device 312a has multiple communication interfaces or is otherwise capable of supporting simultaneous communications with more than one endpoint. A non-limiting example of such a scenario may be with the utilization of an IP-enabled TV (e.g., a smart TV or Internet-connect TV), where data is exchanged over the first communication channel 316a using HTTP or the like and broadcast protocols are used to carry voice or video over the separate communication channel 328. While contents of both communication channels 316a, 328 are addressed to the same device 312a, the communication channels 316a, 328 may be considered separate due to the fact that each channel is carrying media of a different type and/or is between the device 312a and different endpoints.

Figure 3E:
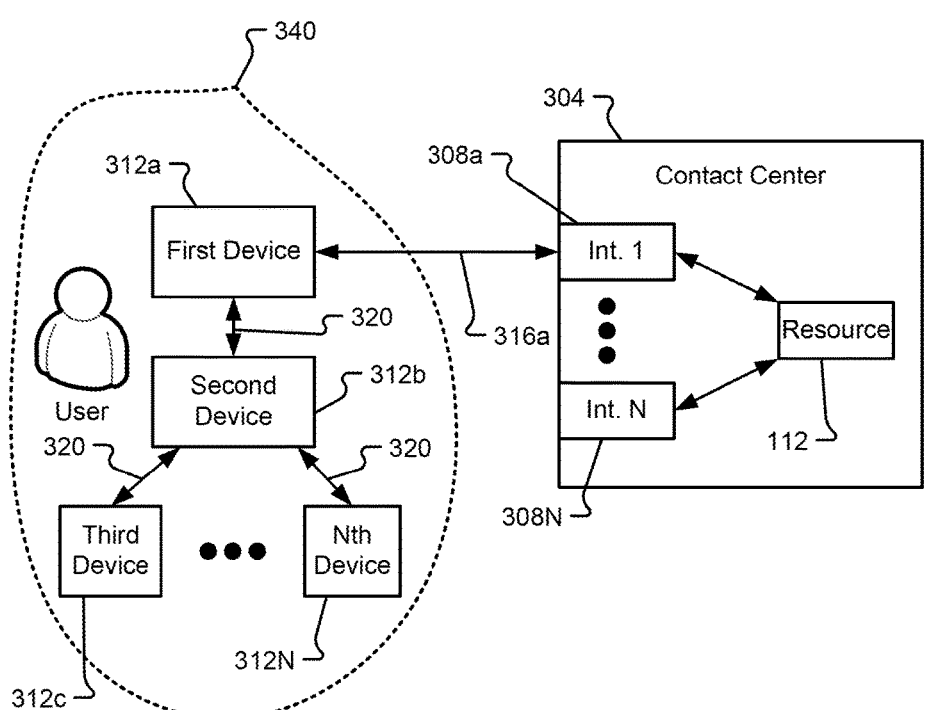
FIG. 3E is a block diagram depicting a fifth illustrative configuration of a contact center interaction in accordance with at least some embodiments of the present disclosure.

FIG. 3E illustrates a fifth possible configuration whereby the user/customer is connected with the contact center 304 over a single communication channel 316a and contextual information about the user's environment 304 is shared with the contact center 304 over the first communication channel 316a. In some embodiments, a user may have up to N communication devices within communication proximity of one another. These devices may correspond to communication-enabled devices or simple devices (e.g., sensors, BLE beacons, repeaters, WiFi routers, access points, etc.). In the depicted embodiment, a user's environment 340 may correspond to an area or space surrounding the user/customer that is sensed or capable of having some aspect thereof captured by an input of a customer device 312a-N. More specifically, the user's environment 340 may correspond to an area in which a WiFi connection with the second device 312b is possible.

The first device 312a may correspond to a TV, the second device 312b may correspond to a router, and the other devices 312c-N may correspond to other devices that are linked or in communication with the second device 312b. As the user communicates with the contact center 304 information obtained from some or all of the communication devices 312a-N may be bundled and shared with the contact center 304, thereby helping the contact center to more effectively service the customer over the first communication channel 316a. It should be appreciated that the user environment 340 may alternatively or additionally correspond to a space that can have sound detected by a microphone of a device 312a-N or a space that can have images captured by a camera of the a device 312a-N.

Figure 4:
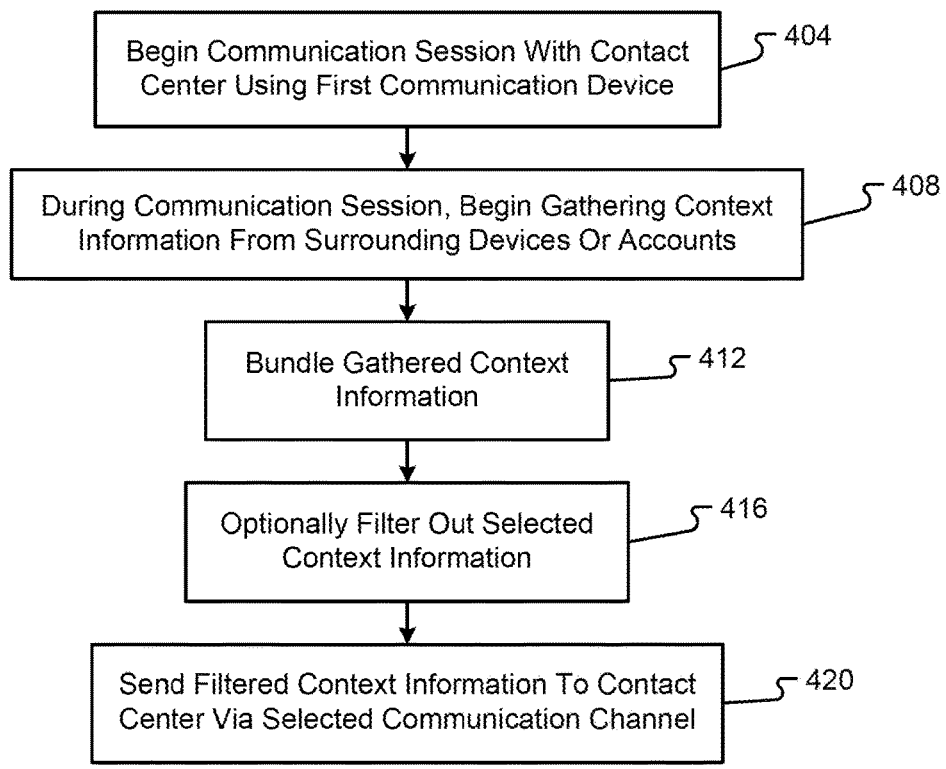
FIG. 4 is a flow diagram depicting a method of engaging a customer with a contact center and delivering context information to the contact center in accordance with at least some embodiments of the present disclosure.

With reference now to FIG. 4, a flow diagram depicting a method of engaging a customer with a contact center 304 and delivering context information to the contact center 304 will be described in accordance with at least some embodiments of the present disclosure. The method begins when a customer initiates or begins a communication session with a contact center 304 using a first communication device 312a (step 404). The first communication session may correspond to an exchange of voice, video, data, or combinations thereof over a first communication channel 316a using a first protocol and a first selected resource 112 of the contact center 304 may be assigned to the customer.

The method continued with the first communication device 312a gathering context information from surrounding devices or accounts during the first communication session (step 408). In some embodiments, the first communication device 312a may begin "listening" to noises and other sounds that are detectable with a microphone of the first communication device 312a. These detected sounds may correspond to one type of context information gathered during step 408. Other types of context information that may be obtained in this step include TV viewing history, usage history of the first communication device 312a, identification of objects within view range of a camera of the first communication device 312a (e.g., objects that are found in an image captured by a camera of the first communication device 312a), identification of devices in proximity and/or communicating with the first communication device 312a, etc.

The gathered context information may then be bundled into an appropriate delivery package or format (step 412). As an example, video and/or audio files may be compressed and stored in a standard file format. Other context information may be individually identified or labeled with a flag that helps identify the nature of the context information. Thereafter, the method may continue with an optional step in which selected context information is filtered (step 416). The type(s) of information that may be filtered include that information that was not subject to a user's approval, information that is sensitive or may divulge private information about the user, etc. A more specific example of information that may be filtered includes moving image data, but audio included in a captured video may be kept. Another example of information that may be filtered in this process includes personally-identifiable information (e.g., names, phone numbers, birthdates, any number, etc.).

The bundled and optionally filtered context information may then be sent from the communication device 312a to the contact center 304 via a selected communication channel (step 420). In some embodiments, the context information may be delivered via the same communication channel being used to facilitate the first communication session. In some embodiments, the context information may be delivered via a separate communication channel or via a backend communication channel between a service provider and the contact center 304.

Figure 5:
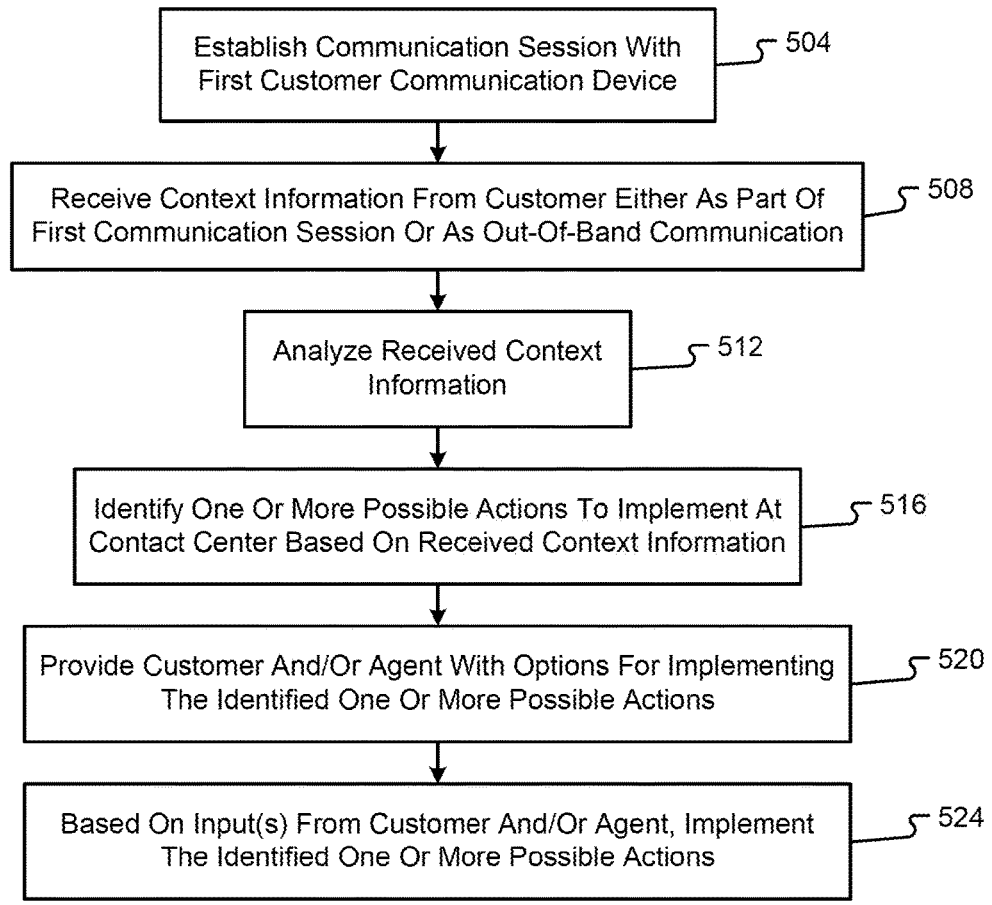
FIG. 5 is a flow chart depicting a method of receiving context information in a contact center and acting on the received context information in accordance with at least some embodiments of the present disclosure.

With reference now to FIG. 5, a flow chart depicting a method of receiving context information in a contact center 304 and acting on the received context information will be described in accordance with at least some embodiments of the present disclosure. The method begins when a communication session is established between a contact center 304 and a first customer communication device 312a (step 504). The first communication session may utilize a first communication channel 316a and may include an exchange of voice, video, and/or data between the first communication device 312a and the contact center 304.

The method continues when the contact center 304 receives context information from the customer either as part of the first communication session or via another source (e.g., an out-of-band communication) (step 508). The out-of-band communication may correspond to an instance where the contact center 304 receives the context information via a service provider portal 332 or via another interface 308b-N that is not being used for the first communication session.

The method continues with the contact center 304 using its various instruction sets (e.g., WAE 208, channel manager 212, experience manager 216, context engine 220, etc.) to analyze the received context information (step 512). In some embodiments, the context engine 220 may correspond to the element of the contact center 304 used to analyze the received context information. The context engine 220 may analyze the context information for an identification of surrounding devices, surrounding device communication capabilities, customer viewing history, customer web browsing history, customer purchase history, customer objects within viewing or communication range of the first communication device 312a, or combinations thereof.

Based on the analysis of the context information, the context engine 140 (alone or in cooperation with another instruction set) may identify one or more possible actions to implement at the contact center 104 (step 516). Some non-limiting examples of actions that could be implemented include routing a call or work item to a particular resource 112 (e.g., implementing a skill-based routing), requesting the user to engage in a second form of communication (e.g., establish a second communication session with the contact center 104), ask the user if the gathered context information can be shared with a service provider, ask the user if additional context information can be requested from a service provider, re-route the first communication session to a different resource 112 (e.g., a specially-trained agent, a supervisor, etc.), or the like.

The customer and/or resource 112 assigned to the customer may further be provided with options for implementing the one or more identified possible actions (step 520). In some embodiments, the customer may correspond to the only entity that is queried about implementing the action. In some embodiments, the agent/resource 112 may correspond to the only entity that is queried about implementing the action. In some embodiments, both the customer and agent/resource 112 may be queried about implementing the action. It should be appreciated that the action may also be implemented without prior approval, in which case the action may simply be performed automatically and without any customer or agent/resource 112 input.

Thereafter, if appropriate, the action(s) may be implemented by the contact center (step 524). This implementation may result in the contact center 304 establishing a second communication channel with the customer, updating an agent script to include a dialog or question about other topic not previously included in the agent's script, re-routing the existing communication to another agent/resource 112, etc.

Figure 6:
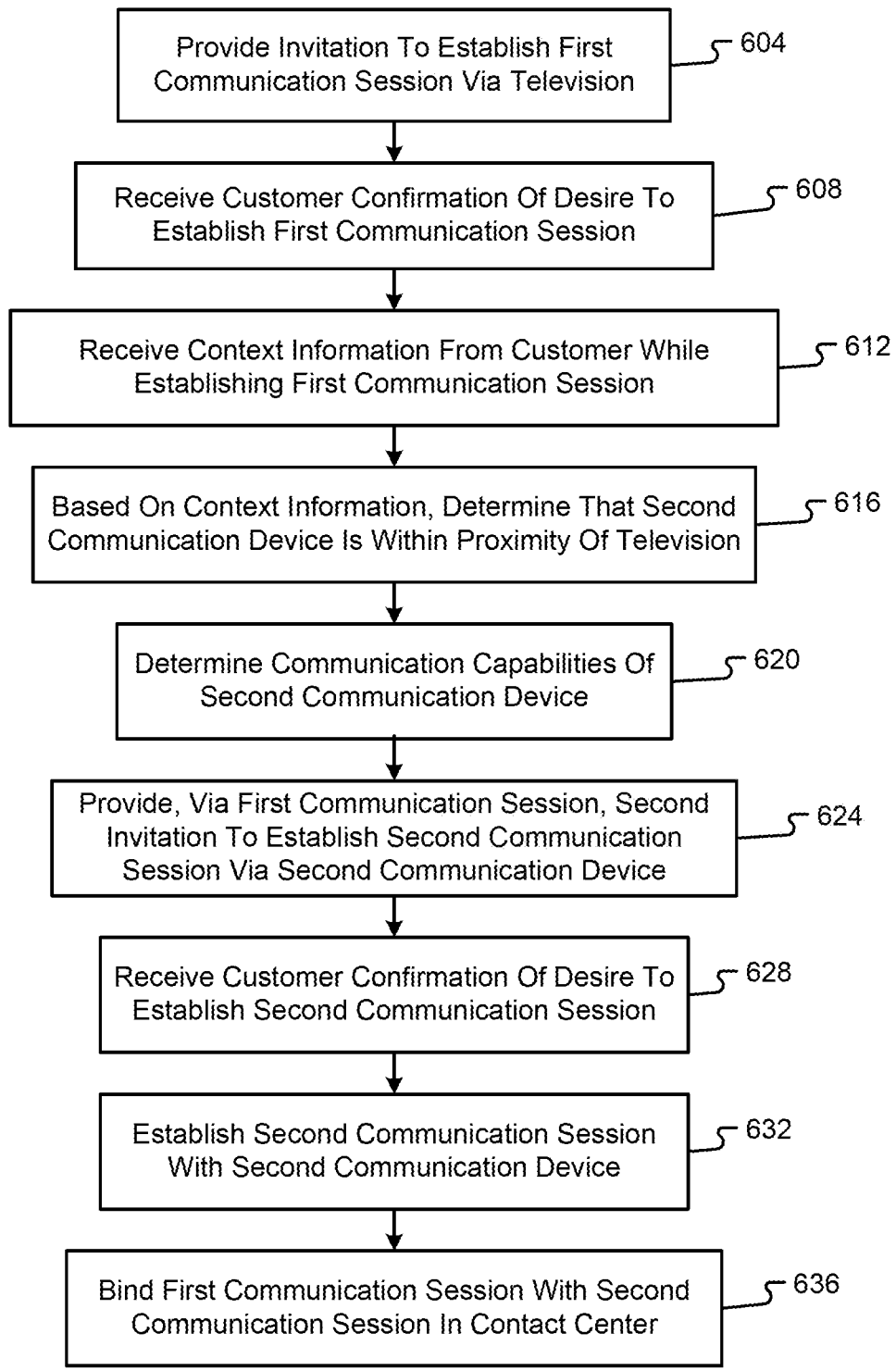
FIG. 6 is a flow chart depicting a method of enabling a multichannel interaction between a customer and contact center in accordance with at least some embodiments of the present disclosure.

With reference now to FIG. 6, a flow chart depicting a method of enabling a multichannel interaction between a customer and contact center 304 will be described in accordance with at least some embodiments of the present disclosure. The method begins with a contact center 304 providing an invitation to establish a first communication with a customer via the customer's TV (step 604). In some embodiments, the TV of the customer may correspond to a first communication device 312a of the customer.

The contact center 304 may then wait until it receives a customer confirmation of the desire to establish the first communication session (step 608). This confirmation may be received over the communication channel already being used to broadcast television/video content, stream video content, or the like to the customer's first communication device 312a. The contact center 304 may also receive context information from the first customer communication device 312a while the first communication session is being established (step 612). In some embodiments, the context information may be conveyed to the contact center 304 along with communication packets that are signifying the desire to implement the contact center or along with communication packets being used to negotiate the parameters of the first communication session (e.g., as an additional header or field in packets). The context information, in some embodiments, may include information about other communication devices within communication proximity of the first communication device 312a. More specifically, the context information may include information about the customer's environment 340, which may include an identity and/or communication capability of any communication device connected to a common local network (e.g., Bluetooth network, WiFi network, etc.) with the first communication device 312a.

Based on the received context information and after the first communication session is established, the method may continue with the contact center 304 determining communication capabilities of a second communication device 312b within proximity of the first communication device (step 620). In some embodiments, the communication capabilities determined for the second communication device 312b may include, without limitation, codec capabilities, media capabilities (e.g., whether the second communication device 312b can send or receive video, voice, data, etc.), user input capabilities (e.g., whether the second communication device 312b has a user touch input or keyboard as opposed to a more simple controller input of a TV to more easily facilitate exchange of data with the user), user output capabilities (e.g., whether the second communication device 312b can display voice, video, etc.), applications on the second communication device 312b, etc.

Based on the determined capabilities of the second communication device 312b, the customer may be provided with a second invitation to establish a second communication session with the contact center 304 (step 624). This invitation may be conveyed to the customer via the first communication session and may further indicate the advantages of using the second communication device 312b to communicate with the contact center 304. For instance, the customer may be notified of the additional or beneficial communication capabilities of the second communication device 312b as compared to the first communication device 312a (e.g., an easier-to-use user input and/or web browser). In some embodiments, the customer may be presented with a QR code, barcode, or the like in the display of the first communication device 312a. If the user scans this particular code using the appropriate application in their second communication device 312b, the second communication device 312b may be directly instructed to contact the contact center 304 (e.g., by calling or texting a number defined in the displayed code, navigating to a particular URL defined in the displayed code, etc.). In some embodiments, the code may be communicated to the second communication device 312b via some other non-visual mechanism such as via Bluetooth, BLE, infrared, NFC, etc.). Alternatively or additionally, a call number may be displayed via the first communication channel and the user may simply dial the displayed number using their second communication device 312b. Analogously, instead of dialing a particular number, a particular URL and code may be displayed to the user via the first communication channel and the user may simply navigate the browser of their second communication device 312b toward the displayed URL.

Once the user responds to the second invitation (e.g., by scanning the code, clicking a button displayed via the first communication device, dialing the number displayed by the first communication device 312a, or navigating to the URL displayed by the first communication device 312a) (step 628), the method continues with the contact center 304 establishing a second communication session with the customer's second communication device 312b (step 632). The first and second communication sessions may utilize different communication paths or channels 316a, 316b. In some embodiments, the different communication sessions and/or communication channels 316a, 316b may be bound with one another in the contact center 304 (step 636). This binding may enable the contact center 304 to view both communication sessions as belonging to a single and common customer interaction. In some embodiments, the communication sessions may be bound to one another by linking identifies of each communication session to a common identifier in a database (e.g., CRM database) of the contact center 304. This binding may enable the contact center 304 to route both communication sessions to a common agent/ resource 112 if desired and may further enable the contact center 304 to analyze both communication sessions as a single customer interaction after the sessions are completed (e.g., for reporting, developing post-call analytics, etc.).

Figure 7:
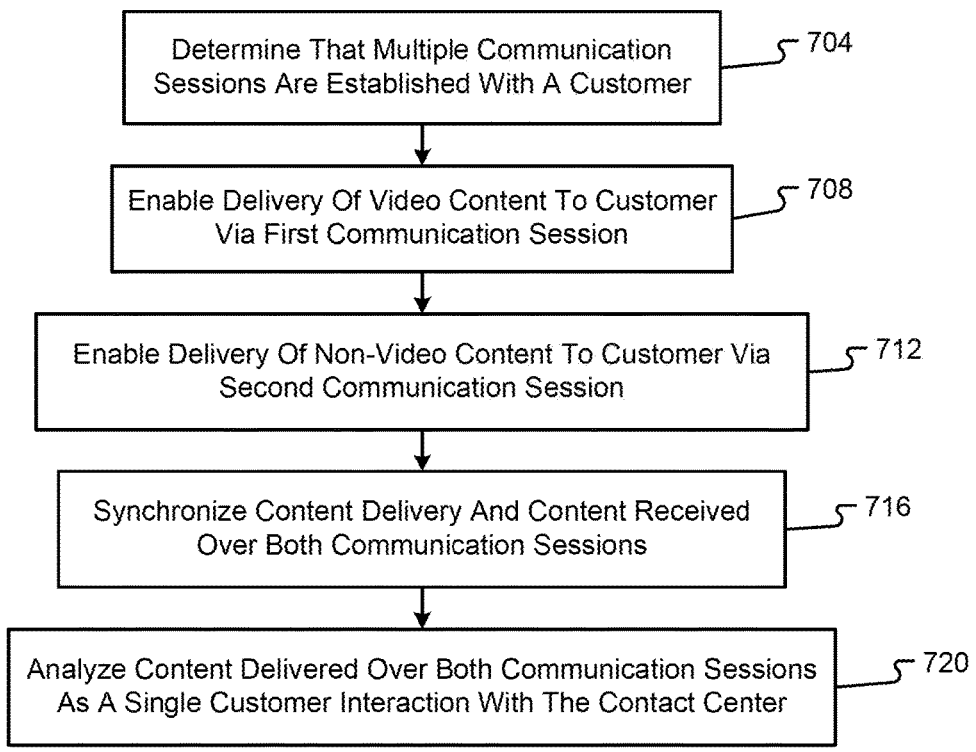
FIG. 7 is a flow chart depicting a method of analyzing interactions in a multichannel contact center in accordance with at least some embodiments of the present disclosure.

With reference now to FIG. 7, a flow chart depicting a method of analyzing interactions in a multichannel contact center will be described in accordance with at least some embodiments of the present disclosure. The method begins by determining that multiple communication sessions are established between a contact center 304 and a single customer (step 704). This determination may be made in a number of ways including use of a particular code that binds the communication sessions during their initiation.

The method continues by enabling delivery of video content to the customer via a first communication session (step 708). In some embodiments, the first communication session may utilize a first communication channel 316a which is particularly well-suited for the delivery of video. As a non-limiting example, the first customer communication device 312a that is involved in the first communication session may correspond to a TV and the first communication channel 316a may correspond to a video broadcast channel, a media streaming channel, or the like. In some embodiments, a second device could be a conduit for delivering customer comments up to the agent. This may raise echo cancellation issues in which audio of the TV needs to be canceled in the audio that is delivered to the agent. Alternatively or additionally, a two-way audio channel may be set up. Furthermore, it may be possible to enable the customer to Instant Message or chat with the agent via an alternative communication pathway that does not include the TV (or which may include the TV).

Accordingly, the method continues by enabling delivery of non-video content to the customer via the second communication session (step 712). In some embodiments, the second communication session may utilize a second communication channel 316g which is particularly well-suited for the delivery of non-video content (e.g., data). In some embodiments, the agent/resource 112 assigned to both communication sessions may interact with the customer as if there was only one communication channel being used. However, video content of the agent/resource 112 may be separated from the non-video content in the channel manager 124 of the contact center such that the video content is carried over the first communication channel 316a and non-video content (e.g., data, web browsing information, co-browsing information, etc.) may be carried over the second communication channel 316b. However, the agent/resource 112 may only being using a single communication device (e.g., a computer with a camera attached thereto).

The video and non-video content may be synchronized in their delivery to the customer even though the different contents are received over different communication sessions (step 716). In some embodiments, this may cause the customer experience to feel like a single interaction even though two different communication devices 312a, 312b are being used by the customer. Furthermore, content received from both communication devices 312a, 312b during both sessions may be analyzed at the contact center 304 as a single customer interaction (step 720). This furthers the notion that the customer experience is a single interaction with the contact center 304 even though multiple communication channels 316a, 316b are being used.

Figure 8:
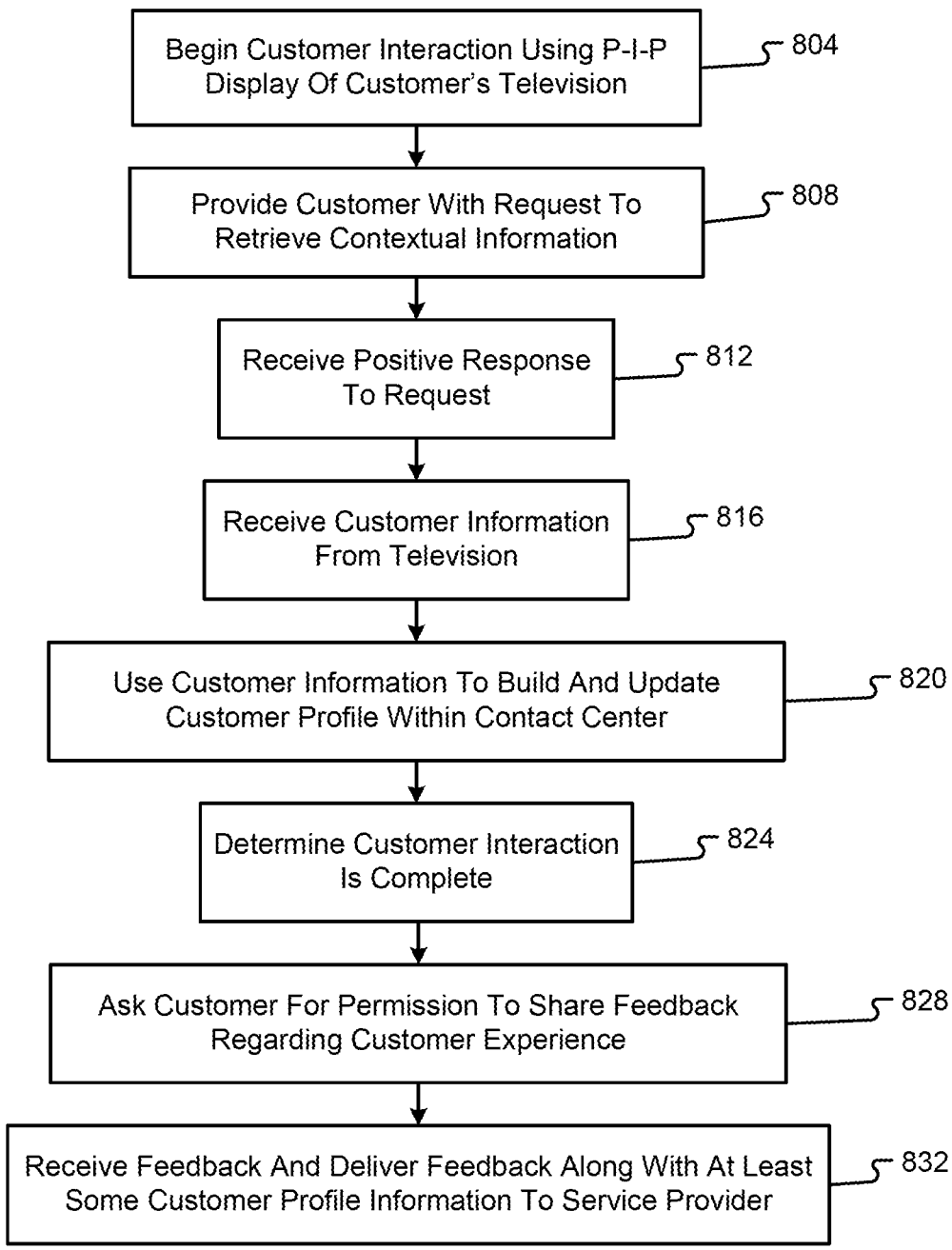
FIG. 8 is a flow chart depicting a method of obtaining customer feedback in a multichannel contact center in accordance with at least some embodiments of the present disclosure.

With reference now to FIG. 8, a flow chart depicting a method of obtaining customer feedback in a multichannel contact center will be described in accordance with at least some embodiments of the present disclosure. The method begins with a first customer interact being facilitated by a Picture-in-Picture (P-I-P) display through the customer's TV (e.g., first communication device 312a)(step 804). Via this P-I-P display or some other method, the customer may be provided with a request for the contact center 304 to retrieve or otherwise receive contextual information regarding the customer's environment 340 (step 808). Examples of this request may include a request for specific contextual information (e.g., "can we scan the room surrounding the TV for connected devices", "can we retrieve data about your viewing history", "can we take an audio sample/record the environment 340", "can we take an image of the environment 340 surrounding the TV", etc.), a request for generic contextual information (e.g., "can we ask a service provider for contextual information", "can we receive any contextual information available to your TV over the last 20 minutes", etc.).

When the customer positively responds to the request (e.g., affirmatively indicates a willingness to share context information (step 812), the method may continue with the contact center receiving customer context information (step 816). This contextual information may be received via the TV and the first communication channel 316a linking the first communication device 312a with the contact center 304. In some embodiments, the contextual information may be received via an out-of-band communication pathway.

The received contextual information may be used to build and/or update a customer profile within the contact center 304 (step 820). This updating of a customer profile include updating a profile of the customer in the contact center's 304 CRM database. The context information may continue to by dynamically updated and received at the contact center 304, in which case the contact center 304 may continue updating the customer profile.

Once it is determined that the customer interaction is completed (step 824), the method continues by asking the customer for permission to share some feedback regarding their most recent customer experience (step 828). This request may be received via the first communication channel 316a or any other communication channel connecting the customer with the contact center 304. If the customer provides feedback, then the feedback received in step 828 along with other customer profile information may be sent to a service provider or some other entity that has been approved to receive the feedback and/or customer profile information (which represents the context information received during the communication session) (step 832). In some embodiments, the feedback and/or context information provided in step 832 may assist the service provider with improving the services provided to the customer. In some embodiments, the information conveyed from the contact center 304 to the service provider may also be used to update a customer profile at the service provider's CRM database. Alternatively or in addition, the feedback could be used to assist the customer in posting some of the context and feedback to a social media outlet.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A contact center, comprising:
   a processor; and
   computer memory coupled with the processor and comprising instructions that enable the processor to execute functions in connection with administering the contact center, the instructions comprising:
   a work assignment engine that enables the processor to receive contacts from customer communication devices, generate a corresponding work item for the contacts received from the customer communication devices, and select one or more resources in the contact center to connect with the customer communication devices such that a customer can receive service from the contact center;
   a channel manager that enables the processor to connect a selected resource's communication device with a first customer communication device over a first communication channel and receive context information from a surrounding environment adjacent to the first customer communication device; and
   a context engine that enables the processor to parse the context information received from the surrounding environment over the first communication channel and identify a second customer communication device that is within communication proximity of the first customer communication device,
   wherein the context engine and channel manager further enable the processor to identify a communication capability of the second customer communication device, and
   wherein a second communication channel is established between the second customer communication device and the selected resource's communication device to carry non-video content.

2. The contact center of claim 1, wherein the identified communication capability of the second customer communication device comprises a media capability.

3. The contact center of claim 1, wherein the first customer communication device comprises a television, and wherein the first communication channel carries video content.

4. The contact center of claim 1, wherein the first customer communication device comprises a television and wherein the context information includes a viewing history for the first customer communication device.

5. The contact center of claim 1, wherein the context information received over the first communication channel identifies a third customer communication device that is in communication proximity with both the first customer communication device and the second customer communication device.

6. The contact center of claim 5, wherein the context information received over the first communication channel further identifies a communication protocol being used between the first customer communication device and third customer communication device as well as the second customer communication device and third customer communication device.

7. The contact center of claim 1, wherein the channel manager further enables the processor to update an agent script for delivery to the selected resource's communication device, wherein the updated agent script identifies the second customer communication device and provides a script for suggesting that the second communication channel be established between the contact center and the second customer communication device.

8. The contact center of claim 1, wherein the context engine enables the processor to deliver a code to the first customer communication device that is usable by the second customer communication device to establish the second communication session with the contact center and wherein the code delivered to the first customer communication device further enables the second communication session to be bound with the first communication session at the contact center.

9. A communication system that enables communications between a customer communication device and one or more resources of a contact center, the communication system comprising:
   a microprocessor; and
   a computer readable storage medium having instructions stored thereon that enable the processor to perform the following:
   connect a selected resource's communication device with a first customer communication device over a first communication channel;
   receive context information regarding an environment surrounding the first customer communication device; and
   parse the context information received over the first communication channel;
   identify a second customer communication device that is within communication proximity of the first customer communication device;
   identify a communication capability of the second customer communication device, and
   establish a second communication channel between the second customer communication device and the selected resource's communication device to carry non-video content.

10. The communication system of claim 9, wherein the instructions further enable the processor to generate a request for the customer to further interact with the contact center using the second customer communication device.

11. The communication system of claim 10, wherein the identified communication capability of the second customer communication device comprises a media capability, wherein the first customer communication device comprises a television, and wherein the first communication channel carries video content.

12. The communication system of claim 10, wherein the identified communication capability of the second customer communication device comprises a codec capability and wherein the second customer communication device provides a different codec capability from the first customer communication device.

13. The communication system of claim 10, wherein the identified communication capability of the second customer communication device comprises a user input/output capability, wherein the first customer communication device comprises a television, and wherein the second customer communication device comprises a touch-sensitive user input or a keyboard.

14. The communication system of claim 9, wherein the context information received over the first communication channel identifies a third customer communication device that is connected with both the first customer communication device and the second customer communication device, wherein the context information received over the first communication channel further identifies a communication protocol being used between the first customer communication device and third customer communication device as well as the second customer communication device and third customer communication device.

15. A method of enabling a contact center to interact with customers, the method comprising:
- connecting, by a processor, a selected resource's communication device with a first customer communication device over a first communication channel;
- receiving, by the processor, context information regarding an environment surrounding the first customer communication device; and
- parsing, by the processor, the context information received over the first communication channel;
- identifying, by the processor, a second customer communication device that is within communication proximity of the first customer communication device;
- identifying, by the processor, a communication capability of the second customer communication device, and
- establishing a second communication channel between the second customer communication device and the selected resource's communication device to carry non-video content.

16. The method of claim 15, further comprising:
- generating, by the processor, a request for the customer to further interact with the contact center using the second customer communication device over the second communication channel.

17. The method of claim 16, wherein the first communication channel employs a different protocol from the second communication channel, the method further comprising:
- binding, by the processor, the first communication channel with the second communication channel such that the content exchanged over both the first communication channel and second communication channel are treated as belonging to a single customer interaction at the contact center.

18. The method of claim 17, further comprising:
- providing, by the processor, the first customer communication device with a code that, when used by the second customer communication device over the second communication channel enables the first communication channel to be bound with the second communication channel.

\* \* \* \* \*